US012125619B2

(12) United States Patent
Fesshaie et al.

(10) Patent No.: US 12,125,619 B2
(45) Date of Patent: Oct. 22, 2024

(54) SELF-LIMITING HEATER

(71) Applicant: Littelfuse, Inc., Chicago, IL (US)

(72) Inventors: Efrem Fesshaie, Brundall (GB); Paulius Kabisius, Kaunas (LT); Jianhua Chen, Sunnyvale, CA (US); Rimantas Misevicius, Kauno (LT)

(73) Assignee: Littelfuse, Inc., Chicago, IL (US)

( * ) Notice: Subject to any disclaimer, the term of this patent is extended or adjusted under 35 U.S.C. 154(b) by 423 days.

(21) Appl. No.: 17/181,527

(22) Filed: Feb. 22, 2021

(65) Prior Publication Data

US 2021/0265085 A1 Aug. 26, 2021

Related U.S. Application Data

(60) Provisional application No. 62/981,650, filed on Feb. 26, 2020.

(51) Int. Cl.
*H01C 7/02* (2006.01)
*H05B 3/00* (2006.01)

(52) U.S. Cl.
CPC ........... *H01C 7/021* (2013.01); *H05B 3/0014* (2013.01); *H05B 2203/02* (2013.01); *H05B 2203/035* (2013.01)

(58) Field of Classification Search
CPC ........ H01C 7/02; H01C 7/021; H05B 3/0014; H05B 2203/02; H05B 2203/035; H05B 2203/013
See application file for complete search history.

(56) References Cited

U.S. PATENT DOCUMENTS

| | | | | |
|---|---|---|---|---|
| 4,017,715 A * | 4/1977 | Whitney | H05B 3/146 264/105 |
| 5,166,658 A | 11/1992 | Fang et al. | |
| 2011/0297665 A1* | 12/2011 | Parker | H05B 3/22 219/494 |
| 2014/0131904 A1* | 5/2014 | Tang | B01F 23/20 261/157 |
| 2016/0223957 A1 | 8/2016 | Hayamizu | |
| 2017/0135227 A1* | 5/2017 | Ramakrishna | H05K 1/09 |
| 2017/0158898 A1* | 6/2017 | Xiao | C09D 11/104 |
| 2020/0146112 A1* | 5/2020 | de Bock | H05K 7/20 |
| 2021/0153306 A1* | 5/2021 | Boegershausen | H05B 1/0236 |

FOREIGN PATENT DOCUMENTS

| | | |
|---|---|---|
| JP | 53018837 A | 1/1978 |
| WO | 2019220981 A1 | 11/2019 |

OTHER PUBLICATIONS

Extended European Search Report mailed Jul. 19, 2021 for European Patent Application No. 21159366.0.

* cited by examiner

*Primary Examiner* — Justin C Dodson
(74) *Attorney, Agent, or Firm* — KDW Firm PLLC

(57) ABSTRACT

A self-limiting heater and method for building the self-limiting heater are disclosed. The self-limiting heater consists of a resistor and a PTC resistor coupled together in series with a power supply. Both resistive devices have good thermal coupling. The resistor has a minimal resistance change over changes in temperature while the resistance of the PTC resistor increases with an increase in temperature. The ohmic resistance ratio between the resistor and the PTC may be used to adjust the heater characteristics and limit the characteristic sharpness.

5 Claims, 12 Drawing Sheets

300

SELF-LIMITING HEATER

CROSS REFERENCE TO RELATED APPLICATION

This application claims the benefit of priority to, U.S. Provisional Patent Application No. 62/981,650, filed Feb. 26, 2020, entitled "SELF-LIMITING HEATER," which application is incorporated herein by reference in its entirety

BACKGROUND

Positive Temperature Coefficient (PTC) devices are made from materials that have an initial resistance that is responsive to temperature. As the temperature of the PTC device increases, its resistance also increases. As current passing through the PTC element increases above a predefined limit, the PTC element may heat up, causing the resistance of the PTC element to increase and dramatically reduce or arrest the flow of current through the protected device. Damage that would otherwise result from unmitigated fault currents flowing through the circuit is thereby prevented.

PTC devices have fairly low stability over their lifetime and over temperature, making them poorly suited for heating applications. PTC heating devices possessing a high temperature coefficient will decrease their power dissipation rapidly, even with small temperature changes. Thus, the effectiveness of the heater using such PTC devices will be limited. PTC devices possessing a low temperature coefficient will not have steep temperature limiting characteristics.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a self-limiting heating device in accordance with the present disclosure may include a voltage source, a resistor comprising a minimal resistance change over changes in temperature, a positive temperature coefficient (PTC) resistor, wherein the resistor and the PTC resistor are coupled to one another in series, are thermally coupled to one another, wherein the self-limiting heater automatically reduces its power output in response to reaching a predefined power output.

An exemplary embodiment of a method of manufacturing a self-limiting heating device in accordance with the present disclosure may include coupling a resistive element to a copper layer of a metal-based substrate printed circuit board (PCB), coupling a positive temperature coefficient (PTC) element to the copper layer of the metal-based substrate PCB, wherein the resistive element and the PTC element are in series with one another, coupling a power source comprising first and second terminals to the copper layer of the metal-based substrate PCB, wherein the first terminal couples to the resistive element and the second terminal couples to the PTC element, wherein the metal-based substrate PCB increases in temperature in response to a voltage being issued from the power source, wherein the temperature of the self-limiting heater does not exceed a predefined temperature.

DETAILED DESCRIPTION

A self-limiting heater and method for building the self-limiting heater are disclosed. The self-limiting heater consists of a resistor and a PTC resistor coupled together in series with a power supply. Both resistive devices have good thermal coupling. The resistor has a minimal resistance change over changes in temperature while the resistance of the PTC resistor increases with an increase in temperature. The ratio of the resistance of the resistor and the PTC resistor are selected to ensure that some of the limitations of PTC resistors are avoided.

Self-limiting means that the heater limits its heating power output. The self-limiting capability of the heater may mean that power to the heater is cut off or reduced significantly (almost to zero power). Or self-limiting may mean that the power is decreased to a certain predefined limit.

Figure 1:
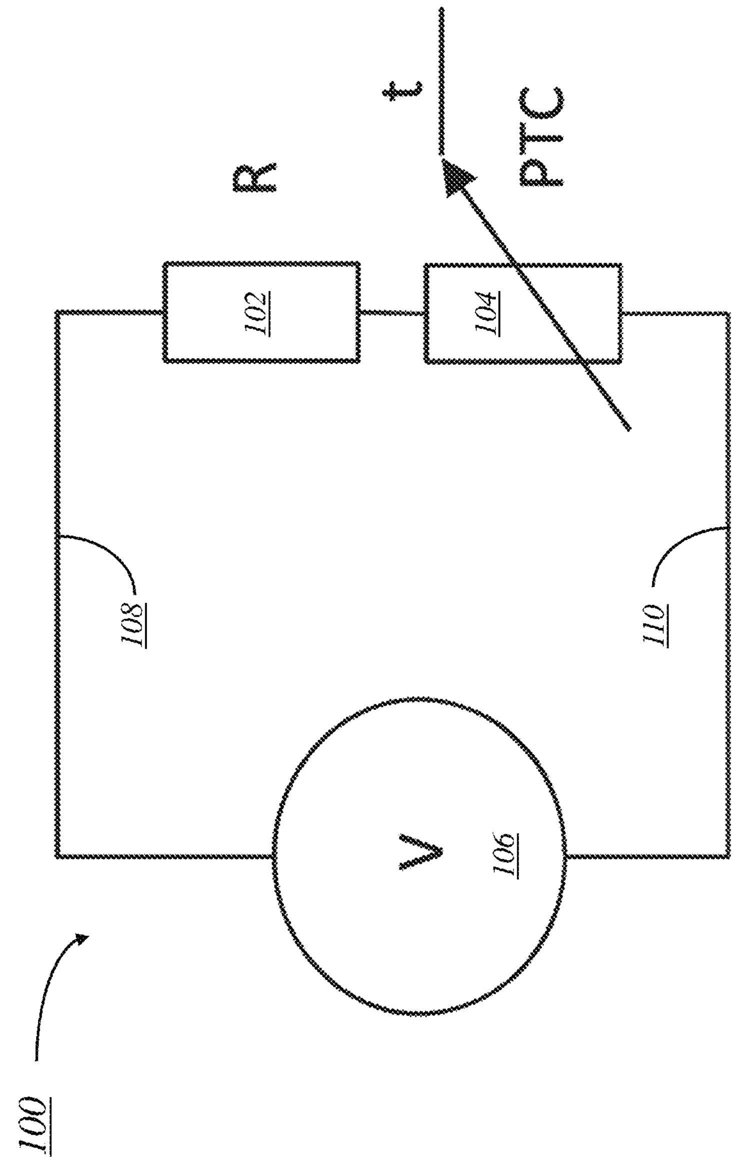
FIG. 1 is a diagram illustrating a circuit diagram of a self-limiting heater, in accordance with exemplary embodiments.

FIG. 1 is a representative drawing of a circuit 100 having a resistor element 102 coupled to a PTC element 104, according to exemplary embodiments. The circuit 100, also known herein as a resistive heating device 100, is described in more detail below. The resistor element 102 of the circuit 100 is electrically connected to the PTC element 104 in series. Although a single resistor element 102 and a single PTC element 104 are shown, there may be multiple resistor elements and/or PTC elements making up the circuit 100. Hereinafter, these elements will be referred to as "resistor 102" and "PTC 104", respectively. A power source 106 is coupled to the resistor 102 and PTC 104, with a first terminal of the power source 108 being connected to the resistor and a second terminal of the power source 110 being connected to the PTC.

The circuit 100 represents a resistive heating device, which is built using at least two resistive elements, the resistor 102 and the PTC 104. In exemplary embodiments, the first of the resistive elements, resistor 102 in FIG. 1, has a very small resistance change over changes in temperature, in other words, a low temperature coefficient. This means that, even if there are changes in the temperature of the circuit 100, there will not be much of a change in the ohmic resistance of the resistor 102. In exemplary embodiments, the change in ohmic resistance will not change by more than 1000 ppm per degree Celsius (° C.), even where the temperature changes by between −40° C. and +160° C.

The second of the resistive elements in the resistive heating device 100, the PTC 104 in FIG. 1, has a resistance with a high dependency to temperature and a positive temperature coefficient. In other words, as the temperature of the resistive heating device 100 changes, the resistance of the PTC 104 will also change. Further, in exemplary embodiments, as the temperature of the resistive heating device 100 increases, the resistance of the PTC 104 will increase; and as the temperature of the resistive heating device decreases, the resistance of the PTC will decrease. In exemplary embodiments, the change in ohmic resistance will change by from a few percent to up to a thousand times its original value, where the temperature changes by between −40° C. and 160° C. degrees Celsius (° C.).

The resistor 102 and the PTC 104 are electrically connected in series, as illustrated in FIG. 1. Further, in exemplary embodiments, the resistor 102 and the PTC 104 have good thermal coupling to one another. The thermal coupling is described in more detail below.

Printed circuit boards (PCBs) have traditionally been manufactured using fiberglass materials such as FR-4. Metal-based substrate PCBs are becoming more common for certain high-power applications. The metal-based substrate PCBs dissipate heat away from the components on the PCBs. Almost any metal can be used for metal-based substrate (metal-cladded) PCB manufacturing. Aluminum PCBs are popular in many industries, including, but not limited to, high-power power supplies and LED light bulbs, for example.

Figure 2A:
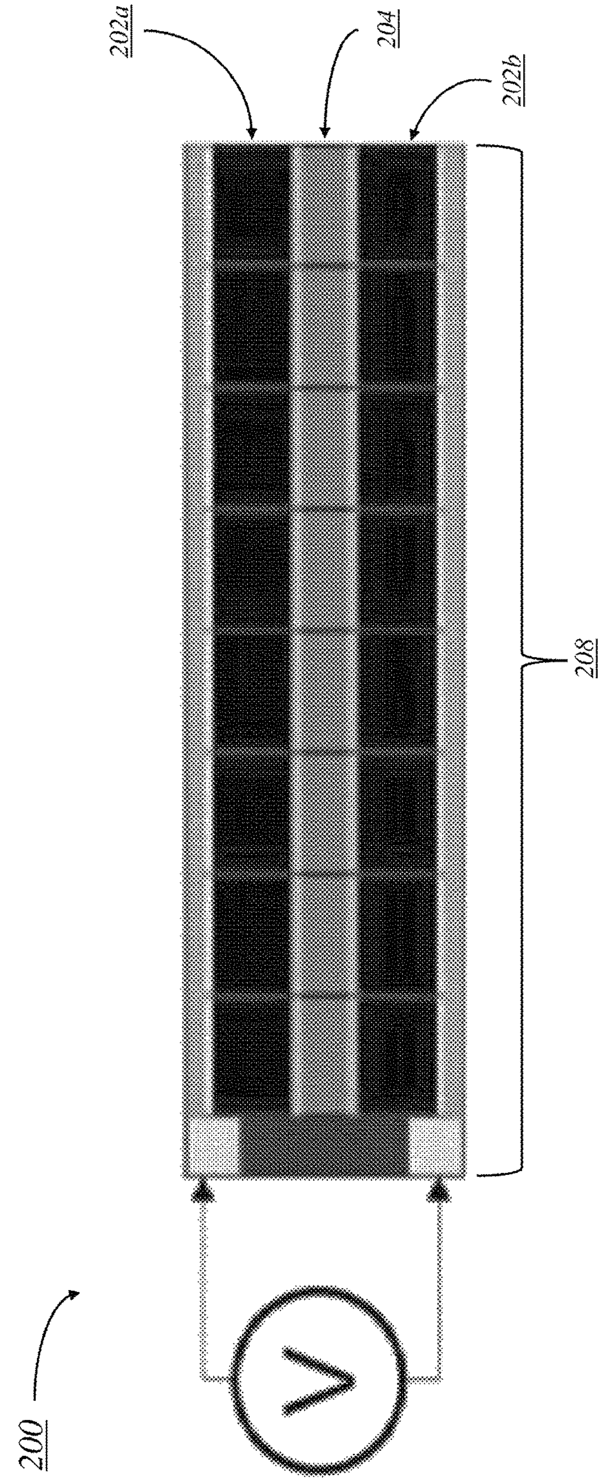
FIGS. 2A and 2B are top- and side-views of a self-limiting heater on a metal-based substrate PCB, in accordance with exemplary embodiments.
Figure 2B:
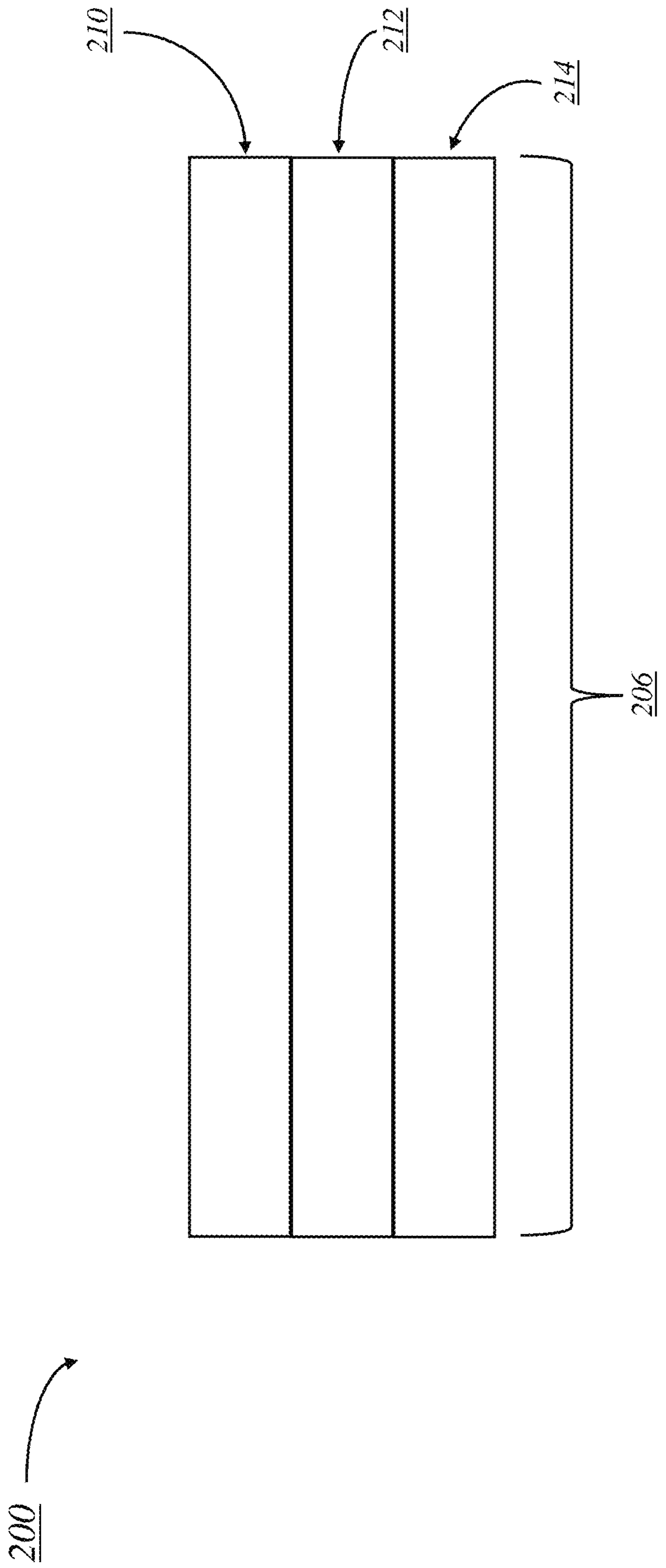

A resistive heating device in accordance with the circuit 100 may be made using a metal-based substrate PCB. FIGS. 2A and 2B are top- and side-view illustrations of a resistive heating device 200, in accordance with exemplary embodiments. In the top view (FIG. 2A), the resistive heating device 200 is disposed on a metal-based substrate or metal-clad PCB 208, and includes a resistor 202*a*, a resistor 202*b* (collectively, "resistors 202"), and a PTC 204 disposed between the two resistors.

Metal-based substrate or metal-cladded PCBs are made of metal-based laminates covered by copper foil circuit layers. The metal may be aluminum, magnesium, and combinations of materials, such as silumin (Al—Mg—Si). Metal-based substrate PCBs consist of a base layer, consisting of a metal substrate, such as an aluminum-based alloy, a dielectric (thermal insulation) layer, which may be the FR-4 of legacy PCBs, and a circuit layer made up of copper foil. All PCB boards have at least a single metal layer, which is usually, but not limited to copper. The substrate refers to the main body of the PCB, which is metal-based. Alternatively, the substrate could be made of FR-4. Or, the PCB may consist of copper inlay or the PCB could be a ceramic PCB such as alumina or aluminum nitride. The dielectric layer absorbs heat as current flows through circuits on the copper layer, and the heat is transferred to the aluminum layer, where it is then dispersed. Metal-based substrate PCBs do a much better job of dissipating heat than legacy PCBs.

The side view of the resistive heating device 200 (FIG. 2B) shows a top (circuit) layer 210, a middle (dielectric) layer 212, and a bottom (metal substrate) layer 214. The side view is not drawn to scale, as the thickness of each layer may vary. FR-4 is a fairly good heat insulator. The lower the thickness, the better the thermal coupling and power transfer between the heat source and the metal layer (aluminum), which acts as a heatsink. For example, the thickness of the dielectric layer 212 may be as low as 0.1 mm, while the thickness of the aluminum layer may be, but is not limited to, between 0.4 and 3.2 mm.

In exemplary embodiments, there is good thermal coupling between the resistor 202 and the PTC 204 of the resistive heating device 200, with the PCB being the interface that couples both devices. Good thermal coupling prevents thermal runaway, a type of uncontrolled feedback event in which an increase in temperature changes the conditions in a way that causes a constant increase in temperature, which may result in destruction of one or more components of a circuit/device or media/device that is being heated. In one embodiment, the thermal coupling of the resistive heating device 200 is achieved by soldering both the resistor 202 and the PTC 204 onto the bottom metal substrate layer 214, which may be aluminum. By soldering these devices onto the aluminum substrate of the PCB 208, this prevents thermal runaway from occurring with the resistive heating device 200.

Figure 3A:
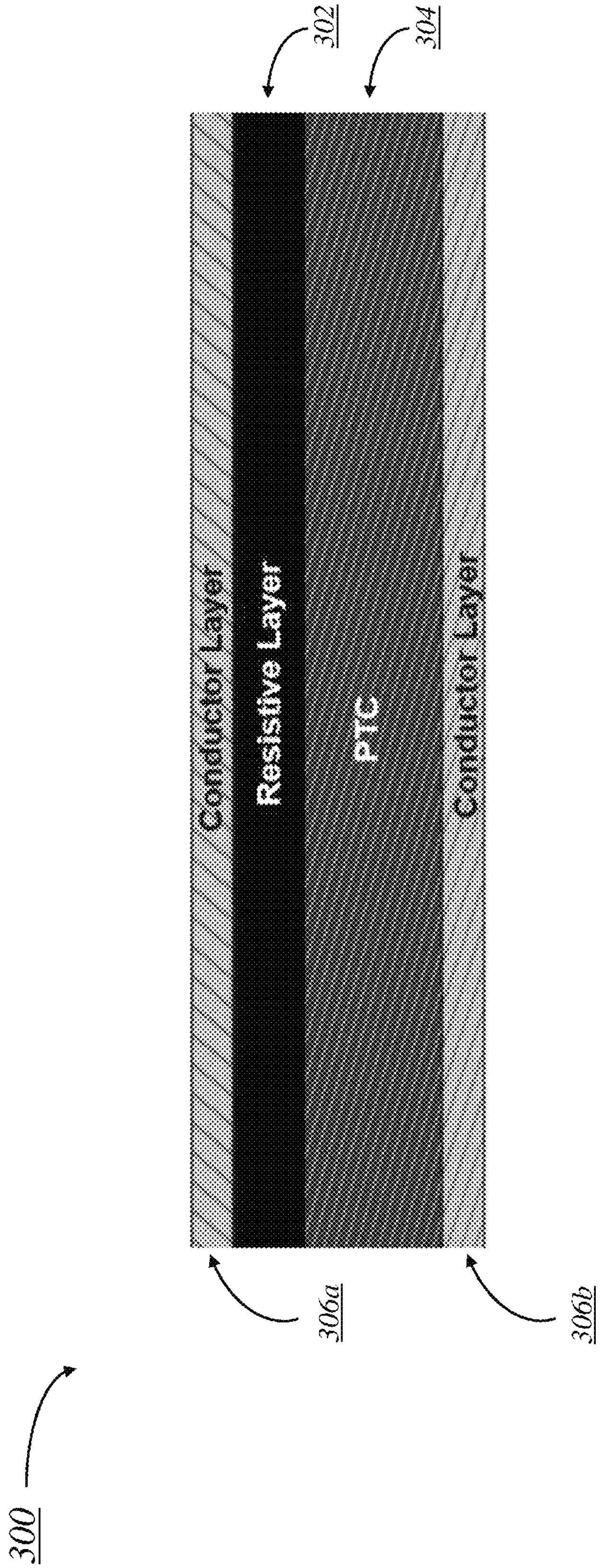
FIGS. 3A and 3B are diagrams illustrating a thermal coupling method for the self-limiting heater of FIG. 2, in accordance with exemplary embodiments.
Figure 3B:
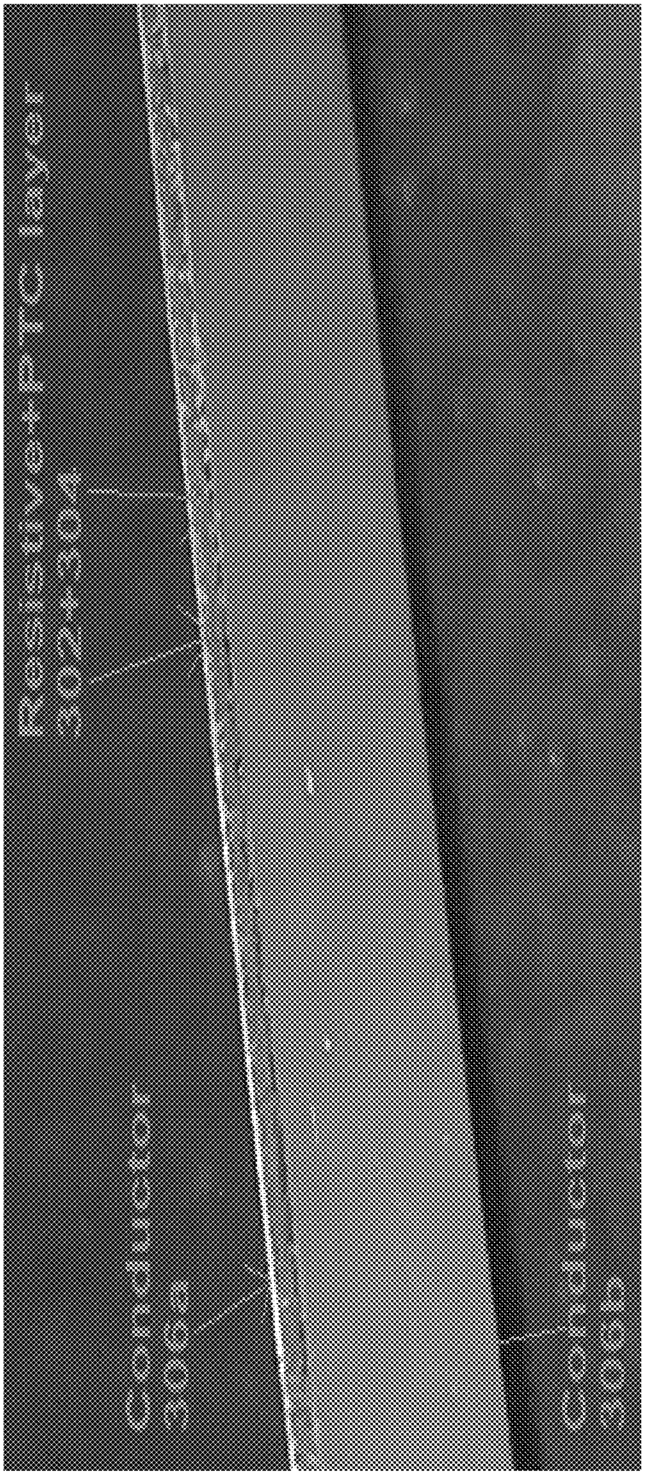

Alternatively, in another embodiment, one of the resistive devices of the resistive heating device 200, the PTC 204, is laminated with a resistive layer, such as using resistive film, between two conductive plates. FIGS. 3A and 3B illustrate this process 300. A PTC layer 304 is laminated with a resistive film 302 or resistive heating element 302, with the laminated PTC layer being disposed between two conductor layers 306*a* and 306*b* (collectively, "conductor layers 306"). The conductor layers 306 may consist of any high conductivity material, including, but not limited to, copper. By laminating the PTC layer 304 with the resistive film 302 and surrounding them with the conductor layers 306, good thermal coupling of the PTC and resistive film is achieved, and the resistive heating element 302 is thus protected from thermal runaway. FIG. 3B provides a pictorial illustration of the process. Good thermal coupling is achieved by having direct contact between the resistive film and the PTC.

As will be familiar to those of ordinary skill in the art, the resistive elements of the resistive heating device 200 may be affixed to the PCB 208 in a variety of ways. The resistor 202 and PTC 204 may be chip resistors which are soldered onto the etched copper top circuit layer 210, a traditional approach. Or, the resistor 202 and PTC 204 may be deposited onto the copper layer, such as by using screen printing. Another approach for creating the resistive heating device 200 may be using resistive ink. When resistive ink is applied to the copper layer of the PCB, it forms an electrical contact between conductive copper and resistive ink. Soldering is providing the same type of interface between conductive solder (which is metal) and resistive material. The embodiments of the present disclosure are not limited in this regard.

Temperature Coefficient

All resistors have an associated temperature coefficient, which is an indication of how much the resistor's ohmic resistance drifts as the temperature departs from an agreed upon reference temperature. If a resistor's reference temperature is 20 degrees Celsius and the temperature at which the resistor is being used is 30 degrees, the resistor's ohmic resistance will change by some amount. The ohmic resistance of a resistor with a minimal resistance change over changes in temperature, say 25 ppm/° C., will not change by much even with a significant change in temperature, while the ohmic resistance of a resistor with a high temperature coefficient, such as 5000 ppm/° C., may change significantly. Thus, resistors with high temperature coefficients may affect the reliability of the circuit in which they reside.

As the name indicates, PTC resistors, short for Positive Temperature Coefficient resistors, also have an associated temperature coefficient. The "P" indicates that, when a temperature increases, the ohmic resistance of the PTC resistor will also increase. (By contrast, the ohmic resistance of a resistor with a negative temperature coefficient (NTC) will decrease as the temperature increases.)

PTC resistors have fairly low stability over their lifetime and over temperature, making them poorly suited for heating applications. Poor stability over temperature refers to resistance at the same temperature and may be different depending on what temperature was reached. For example, suppose a heater including a PTC reaches 20° C. from a very low temperature. In that case, the resistance of the PTC will be lower than when the 20° C. temperature is reached by cooling down the same PTC device. Also, aging of the PTC device has an impact. Over a long time in operation, the resistance of the PTC device will slowly drift, thus changing the power output of the heater. PTC heating devices possessing a high temperature coefficient will be impacted by even small changes in temperature and will decrease their power dissipation rapidly during the temperature change. Thus, the effectiveness of a heater using a PTC device with a high temperature coefficient will be limited.

PTC devices possessing a low temperature coefficient will not be as drastically impacted by changes in temperature as the high temperature coefficient PTC devices. Nevertheless, such low temperature coefficient PTC devices will not have steep temperature limiting characteristics. Such PTCs are also ineffective as they decrease their power output quickly. For some applications, it is important to get the object/device to the optimal operating temperature as fast as possible. In those applications, the power output should be as high as possible. But, the object/device usually has a limit on how much power can be supplied. Steep PTC devices then will lose their output power quickly and the object/device will not be heated sufficiently. On the other hand, a PTC without steep temperature limiting characteristics may not reduce power output and may instead cause overheating.

Figure 4:
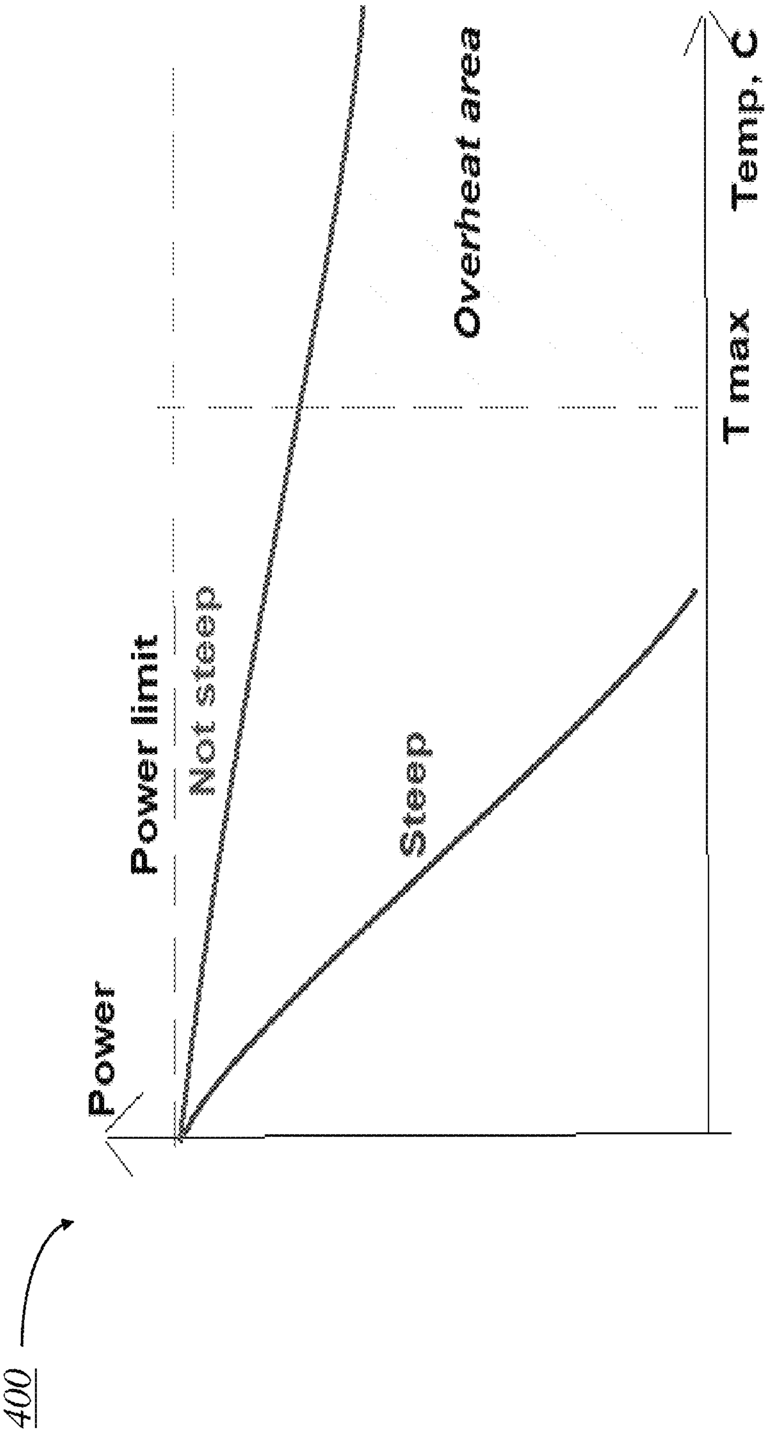
FIG. 4 is a graph illustrating power characteristics of PTC devices, in accordance with exemplary embodiments.

These contrasting characteristics are illustrated in a graph 400 in FIG. 4. The resistive device with steep temperature limiting characteristics loses its output power quickly, such that the object/device including the resistive device will not reach its maximum temperature (given by Tmax). In contrast, the resistive device with not steep temperature limiting characteristics will lose its output power much more slowly, and there is a risk that the object/device will pass the maximum temperature and enter an overheat area.

Power Dissipation

For the resistive heating device 200, the power dissipation will depend on the total resistance of the two (or more) resistive elements and the voltage applied. The power dissipation may be calculated using the following formula:

$$(P=V^2/R_{sum}) \quad (1)$$

where P is the power dissipation of the heater, V is the voltage applied to the heating element, and $R_{sum}$ is the total resistance of the resistive elements connected in series. Since the resistive heating device 200 has two (sets of) resistive elements, this may be stated mathematically as follows:

$$R_{sum}=(\Sigma R+\Sigma R_{PTC}) \quad (2)$$

where R is the resistance of the resistor 202 and $R_{PTC}$ is the resistance of the PTC 204. Where the resistive heating device 200 includes multiple resistors 202 in series, the total resistance of the resistors will be the sum of their individual resistances; likewise, where there are multiple PTCs 204 in series with one another, the total resistance of the PTC 204 will be the sum of their individual resistances. The resistive heating device 200 may employ a single resistor 202 and single PTC 204 or multiples of each, as will be familiar to those of ordinary skill in the art.

The PTC 204 may have relatively low resistance at room temperature compared to the resistor 202. As a result, once the voltage is applied to the resistive heating device 200, the current flowing through the two resistive elements (which are connected in series) will result in most of the power dissipated on the resistor 202. This power dissipation will result in the resistor 202 heating up. The PTC 204, however, will heat up more slowly, as its power dissipation will be small, relative to that of the resistor 202.

As described above, to avoid thermal runaway, especially at low temperatures, good thermal coupling is ensured between the resistive and PTC element(s). Without good thermal coupling, the resistor 202 (and PTC 204) may heat up above a safe limit without triggering power limiting by the resistive heating device 200. This may cause heat spots, for example, or worse, for the resistive heating device 200. Since the PTC 204 will be heated up as a result of the dissipated power of the resistor 202, the resistance of the PTC will increase, resulting in an increase of the sum of the resistances of all elements (equation 2) and a decrease of power, P (equation 1).

Figure 5A:
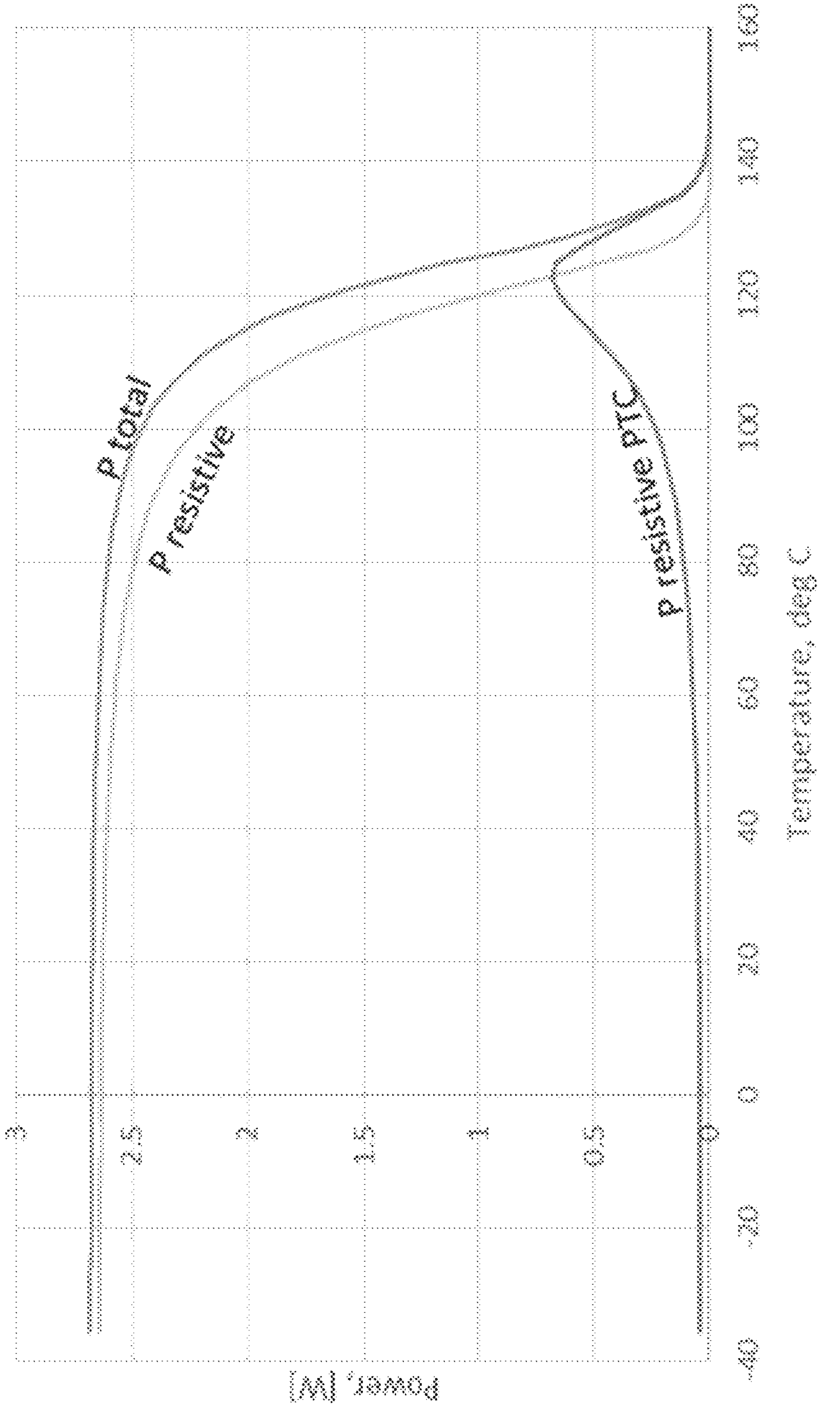
FIGS. 5A-5D are graphs illustrating power characteristics of the self-limiting heater of FIG. 2, in accordance with exemplary embodiments.
Figure 5B:
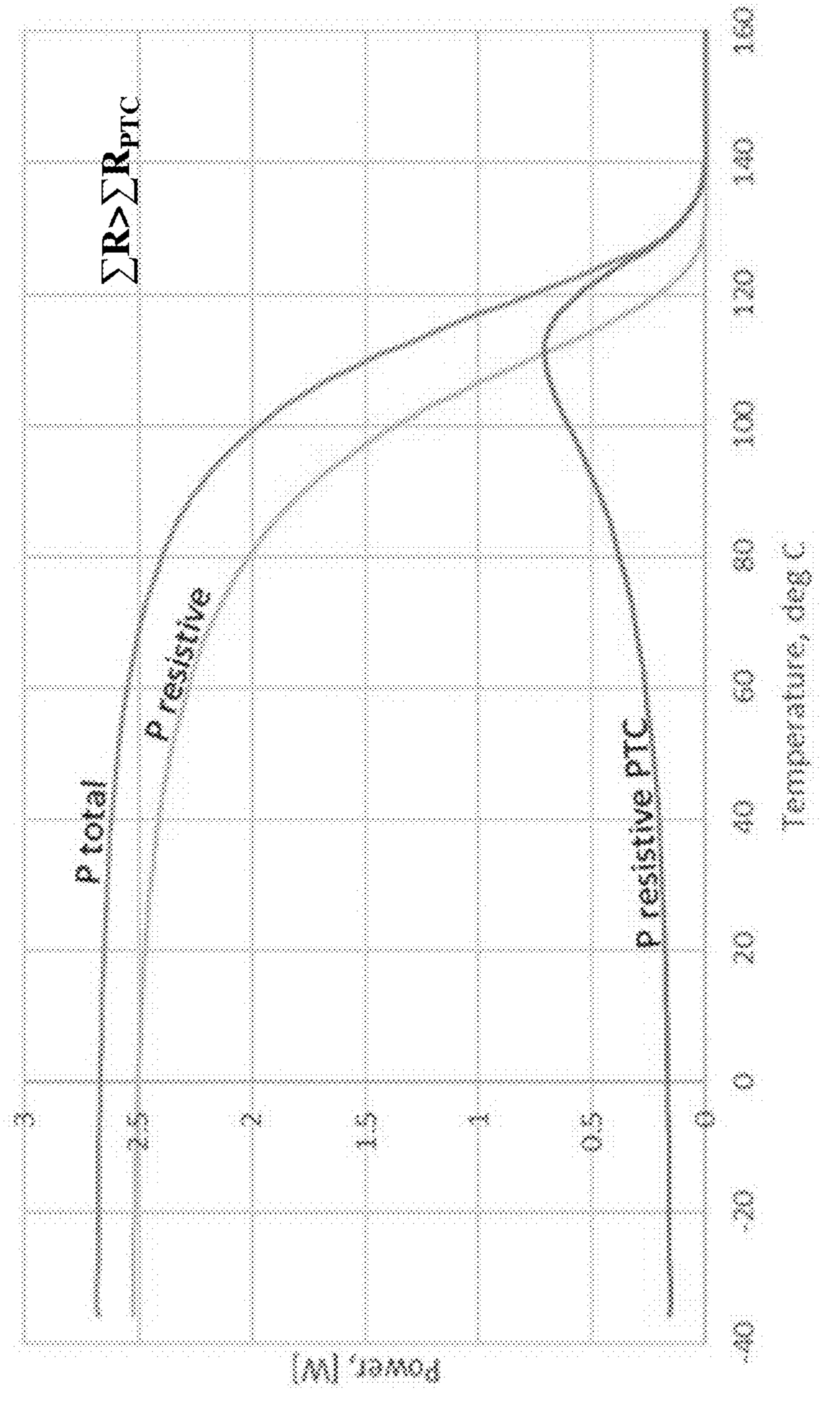
Figure 5C:
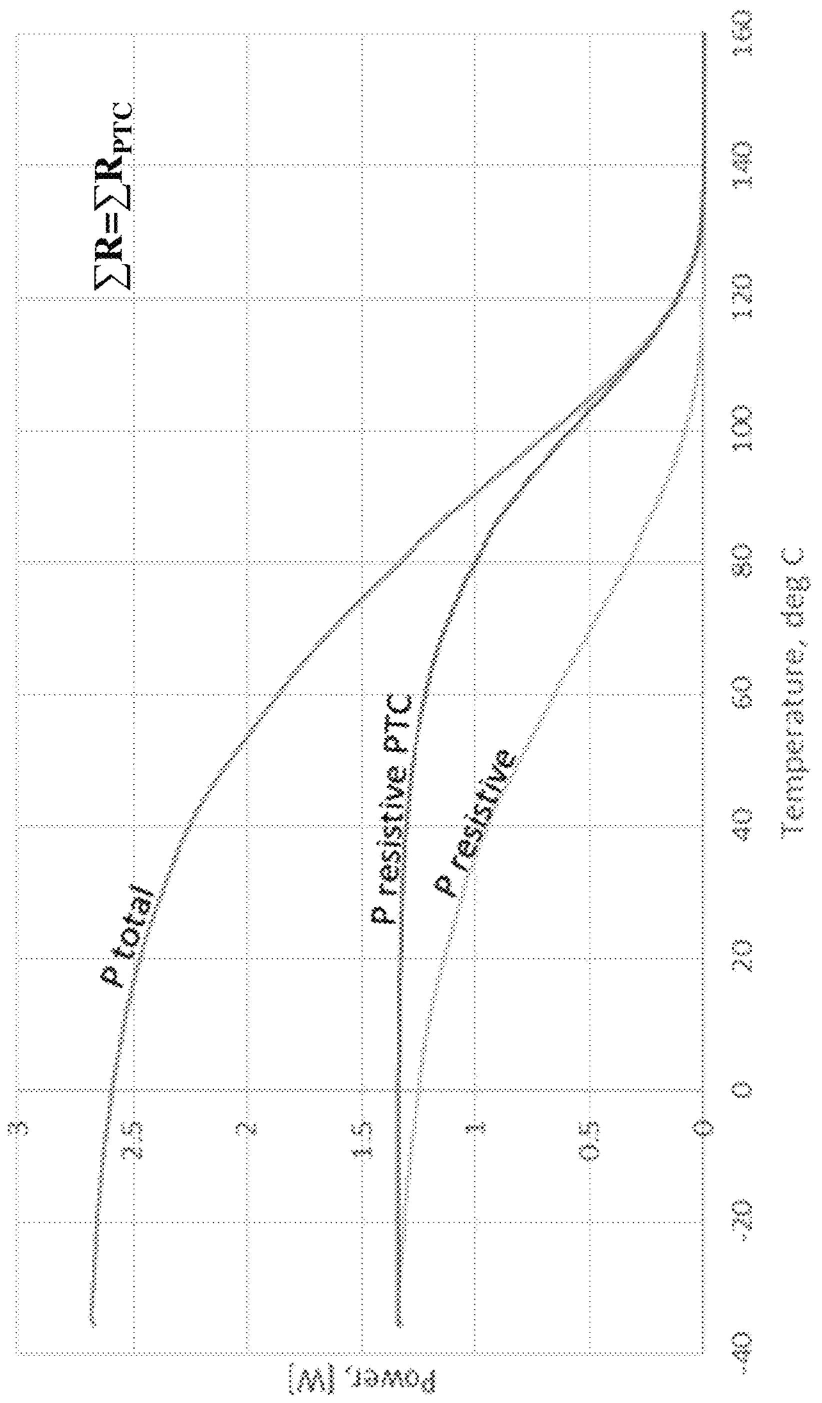
Figure 5D:
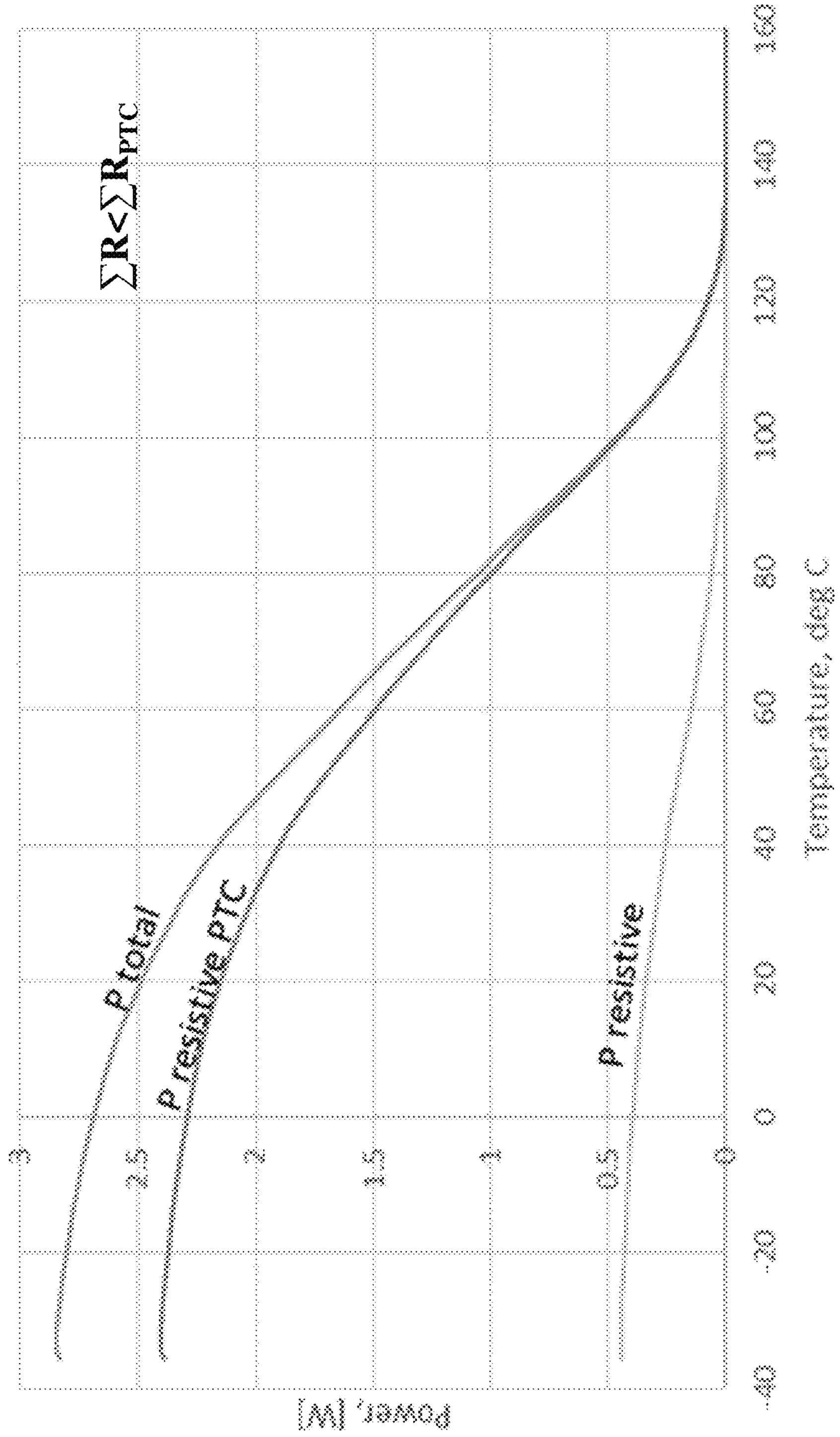

FIGS. 5A-5D illustrate power over temperature characteristics of the resistive heating device 200 in four scenarios: typical (FIG. 5A), resistor 202<PTC 204 (FIG. 5B), resistor 202=PTC 204 (FIG. 5C), and resistor 202>PTC 204 (FIG. 5D). Changing the resistance ratio between the resistor 202 and the PTC 204 under these various scenarios can be fulfilled.

Three Cases:

$\Sigma R>\Sigma R_{PTC}$

In a low temperature range, as long as the sum of the resistances of the resistive elements is higher than the sum of the resistances of the PTC elements (stated mathematically as $\Sigma R>\Sigma R_{PTC}$) (FIG. 5B), the resistive elements will generate a greater portion of power dissipated than the PTC elements, while the heater temperature is much lower than the temperature limiting condition. When the heater temperature increases, the PTC resistance increases and the total power of the heater is decreasing, thus temperature limiting is occurring. The steeper the PTC characteristics (FIG. 4), the sharper the limiting characteristics of the heater achieved.

$\Sigma R=\Sigma R_{PTC}$

Where the sum of the resistances of the resistive element(s) is the same as the sum of the resistances of the PTC element(s) (stated mathematically as $\Sigma R=\Sigma R_{PTC}$) (FIG. 5C), while the heater temperature is much lower than the temperature limiting condition, the resistive element(s) will generate the same amount of power as the PTC element(s). As the heater temperature is increasing and approaching the limiting temperature, the PTC resistance portion is starting to dominate and the limiting condition is occurring. The distinction in this scenario is that the limiting condition is not as sharp as in the $\Sigma R>\Sigma R_{PTC}$ scenario (FIG. 5B).

$\Sigma R<\Sigma R_{PTC}$

When the sum of the resistances of the resistive element(s) is less than the sum of the resistances of the PTC element(s) (stated mathematically as $\Sigma R<\Sigma R_{PTC}$) (FIG. 5D), while the heater temperature is much lower than the temperature limiting condition, the PTC element(s) will start to generate higher power than the resistive element(s). Thus, the heater power output limiting characteristics will be even slower.

The greater the ratio of the two resistive sums ($\Sigma R/\Sigma R_{PTC}$), the flatter the power dissipation response over the temperature range. Further, a lower total power dissipation variation/instability will be caused by the PTC element(s). At the same time, the peak power dissipated by the PTC element(s) will be lower, and vice versa. The lower the ratio $\Sigma R/\Sigma R_{PTC}$ is, the earlier the temperature limiting occurs and, at the same time, the peak power of the PTC element(s) will be higher. The graphs of FIGS. 5A-5D thus inform a mechanism by which the heater characteristics may be adjusted as needed.

Figure 6:
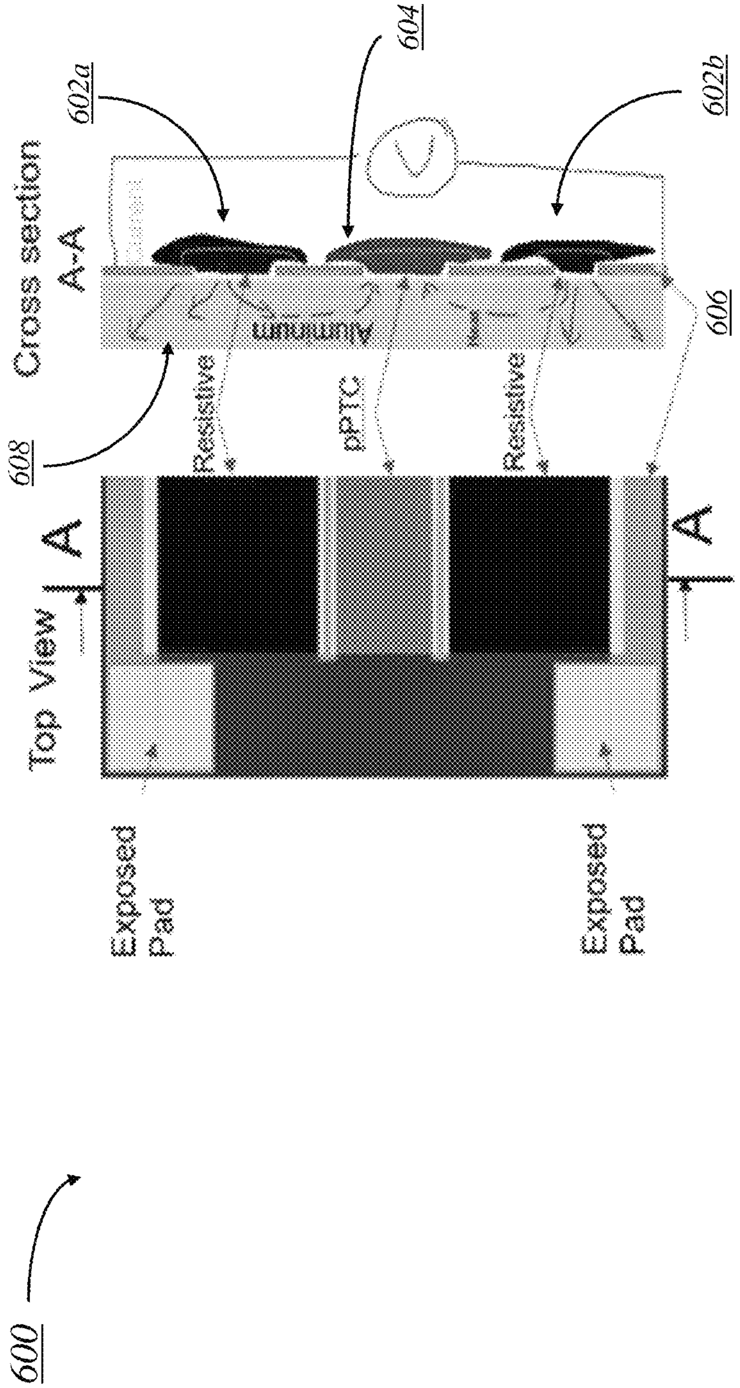
FIG. 6 is a diagram illustrating top- and cross-section-views of a self-limiting heater on a metal-based substrate PCB, in accordance with exemplary embodiments.

FIG. 6 shows top- and cross-sectional-views of a resistive heating device or self-limiting heater 600, in accordance with exemplary embodiments. Resistive elements or resistor chips 602*a* and 602*b* (collectively, "resistors 602") are shown disposed upon the copper layer 606, with a PTC element 604 disposed therebetween. When a voltage is applied and current passes through the resistors 602 and PTC element 604, heat dissipates to the aluminum layer 608. In exemplary embodiments, there is good thermal coupling between the resistors 602 and the PTC element 604. Further, in exemplary embodiments, the resistors 602 have very minimal resistance change over changes in temperature. The two resistors 502*a* and 502*b* may have similar temperature coefficients, but this is not necessary. Instead, having two resistors on opposite sides of the PTC improves thermal coupling, in exemplary embodiments, such that approximately half the heat comes from one side (resistor 502*a*) and half from the other (resistor 502*b*). Further, in exemplary embodiments, the PTC 504 has a resistance with a high dependency to temperature and a positive temperature coefficient.

In an exemplary embodiment, the resistor has a first ohmic resistance while the PTC has a second ohmic resistance and the first ohmic resistance is far from the limiting condition. In one embodiment, the first ohmic resistance is higher than the second ohmic resistance. In a second embodiment, the first ohmic resistance is similar to the second ohmic resistance. In a third embodiment, the first ohmic resistance is less than the second ohmic resistance. The resistance ratio between the resistor and the PTC may thus be used to adjust the heater characteristics and limit characteristic sharpness.

Figure 7:
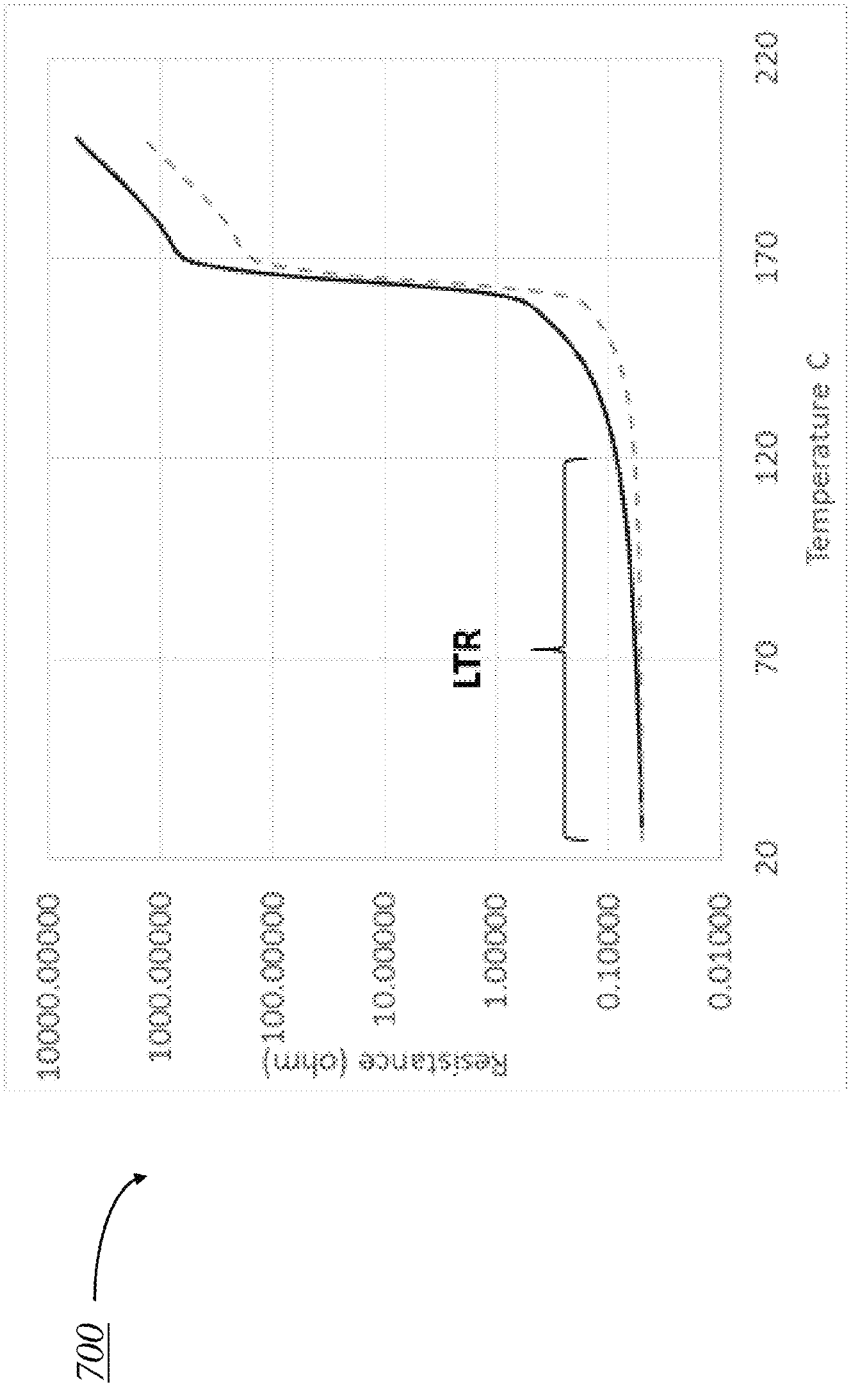
FIG. 7 is a diagram illustrating testing data for a self-limiting heater, in accordance with exemplary embodiments.

FIG. 7 includes a graph 700 of test results for a self-limiting heater, according to exemplary embodiments. The graph plots temperature (° C.) versus total resistance (ohms), where the total resistance is the sum of the resistance of a resistive component ($R_{Resistor}$) and the resistance of a PTC component ($R_{PTC}$). Between a heater operating range of 20° C. and 120° C. (the LTR or low temperature resistance range), the resistance changes only slightly (between 0.08 ohms and 0.10 ohms). Once the temperature increases past 120° C., the resistance begins to increase significantly. Thus, as designed, the heater is self-limiting. The solid line indicates resistance versus temperature of the PTC alone while the dotted line indicates the resistance versus temperature of the PTC and the resistor together. The presence of the PTC with resistor thus ensures that the resistance stays more flat (about the same) as the temperature increases.

The self-limiting heater 600 may be split into smaller segments/units, each exhibiting similar performance. Or the metal-based substrate PCB on which the self-limiting heater 600 is formed may be combined with other heaters in parallel, to form a larger heater for appropriate applications.

In exemplary embodiments, the self-limiting heaters disclosed herein are designed to build good thermal coupling between the resistor element(s) and the PTC element(s). This is different from a PTC fuse, as the limiting is triggered by temperature of the rest of the circuit rather than an increase in current.

Thus, a self-limiting heater is disclosed that has the ability to limit its heating power output. The self-limiting heater may either cut off power significantly or may decrease the power to a certain predefined limit. Many applications have a risk of overheating. In traditional applications, to mitigate this risk, a temperature monitoring device is part of the implementation. Such temperature monitoring may, for example, use some switching mechanism, such as a relay, transistor, or switch, to cut the heater power. Another mechanism for controlling the overheating risk is to utilize power pulsing.

The self-regulating heater disclosed herein is able to avoid these additional safeguards. This is because, once the heater gets to a certain predefined temperature, it drops output power automatically, due to the above-described principles of the resistive and PTC elements, and thus avoids overheating. Further, because it is able to avoid the additional monitoring circuitry, the self-limiting heater is immune to failures that may occur in this circuitry.

There are many risks of overheating in automotive applications. For example, a water tank, if it becomes empty, can melt, causing it to deform, which may result in loss of sealing capability, holes, or other problems. A urea tank, used to protect against dangerous pollutants, may heat, causing the urea to start decomposing. This happens rapidly at temperatures above 60° C., rendering the urea tank ineffective at reducing emissions. A camera lens, which is an external part of a vehicle, may cause burns when touched by a human if it becomes overheated. An overheated battery can catch fire and even explode. This can also happen in the fuel/diesel line. All of these components of an automobile and more may benefit from having a self-limiting heater. Having self-regulating features enables the construction of smaller higher-power heaters as they deliver more reliability and reduce these risks.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A self-limiting heater comprising:
- a voltage source;
- a resistor comprising a minimal resistance change over changes in temperature; and
- a positive temperature coefficient (PTC) resistor,
- wherein the resistor and the PTC resistor;
  - are coupled electrically to one another in series;
  - are thermally coupled to one another; and
  - are disposed on a metal-based substrate printed circuit board (PCB), the metal-based substrate PCB comprising:

a base layer consisting of a metal substrate, wherein the metal substrate is an aluminum-based alloy;

a dielectric layer to absorb heat as current flows through the resistor and the PTC resistor, with the heat being transferred to the base layer; and a circuit layer comprising copper foil;

wherein the self-limiting heater automatically reduces its power output in response to a temperature increase up to a temperature limiting condition.

2. The self-limiting heater of claim 1, wherein the resistor and the PTC resistor are chip resistors soldered onto the metal-based substrate PCB.

3. The self-limiting heater of claim 1, wherein the resistor and the PTC resistor are deposited onto the metal-based substrate PCB using screen printing.

4. The self-limiting heater of claim 1, wherein the resistor and the PTC resistor are applied to the metal-based substrate PCB using resistive ink.

5. The self-limiting heater of claim 1, wherein thermal coupling between the resistor and the PTC resistor prevents thermal runaway.

* * * * *